United States Patent [19]

Burns et al.

[11] 4,128,301
[45] Dec. 5, 1978

[54] OPTICAL WAVEGUIDE POWER DIVIDER

[75] Inventors: William K. Burns, Alexandria, Va.; A. Fenner Milton, Washington, D.C.

[73] Assignee: The United States of America as represented by the Secretary of the Navy, Washington, D.C.

[21] Appl. No.: 782,571

[22] Filed: Mar. 29, 1977

Related U.S. Application Data

[63] Continuation-in-part of Ser. No. 637,628, Dec. 4, 1975, abandoned.

[51] Int. Cl.$^2$ .............................................. G02B 5/14
[52] U.S. Cl. ................................................ 350/96.15
[58] Field of Search ............... 350/96.15, 96.12, 96.13, 350/96.14

[56] References Cited

U.S. PATENT DOCUMENTS

| 3,833,284 | 9/1974 | Kaminow et al. | 350/96.15 |
|---|---|---|---|
| 3,920,314 | 11/1975 | Yajima | 350/96.14 |
| 3,980,392 | 9/1976 | Auracher | 350/96.14 |

OTHER PUBLICATIONS

Wilson et al., "Improved Tolerance in Optical Directional Couplers," Electronic Letters, vol. 9, No. 19, Sep. 1973.

Primary Examiner—John K. Corbin
Assistant Examiner—Stewart Levy
Attorney, Agent, or Firm—R. S. Sciascia; Philip Schneider; Melvin L. Crane

[57] ABSTRACT

An optical waveguide power divider which uses a two-dimensional slab waveguide. An input confined to one arm propagates to a point where synchronism between two closely adjacent guides is abruptly introduced by introducing an overlay with a fast taper. The coupled guides are here sufficiently synchronous and close together that the symmetrical and asymmetrical normal modes of the coupled structure will be excited, each with ½ of the input power. Synchronism is then slowly removed by tapering the overlay to zero so that mode "a" selects arm #1 while mode "b" selects arm #2. These latter changes are adiabatic, i.e., slow enough tAfter synchronism has been removed, the two arms may be spatially separated to split the power into two directions.

3 Claims, 2 Drawing Figures

OPTICAL WAVEGUIDE POWER DIVIDER

CROSS REFERENCE TO RELATED APPLICATION

This application is a continuation-in-part of Application Ser. No. 637,628, filed Dec. 4, 1975 now abandoned.

BACKGROUND OF THE INVENTION

This invention relates to optical waveguides and more particularly to optical waveguide power dividers or couplers.

A power divider is an essential component of any amplitude modulator constructed with optical waveguides which operates by interfering two-phase shifted guided waves. Light passing through the two waveguides is controlled in such a manner that light may be shifted from one waveguide to another. Heretofore a 3-dB power transfer between optical waveguides has been achieved by providing synchronism between two optical waveguides over a critical interaction length, whose magnitude depends upon the coupling between the waveguides.

In prior art devices there are severe tolerance restrictions on both the smoothness and on their mean dimensions, i.e. length of the coupled guides. Such prior art devices have been set forth in an article "Improved Tolerance in Optical Directional Couplers," by M. G. F. Wilson et al., *Electronics Letters*, Vol. 9, #19, Sept. 20, 1973, pp 453–454.

This invention has been set forth in a published article, "Optical Modal Evolution 3-dB Coupler" by W. K. Burns, A. F. Milton, A. B. Lee and E. J. West, *Applied Optics*, Vol. 15, No. 4, April 1976, pp 1053–1065, which is incorporated herein by reference.

SUMMARY OF THE INVENTION

This invention makes use of an optical waveguide arrangement which comprises two paths for spatial power division into two equal parts. The device uses a single region of mode conversion followed by a region of adiabatic modal evolution in which no mode conversion occurs. These two regions are provided by an overlay with fast and slow tapers, which makes the device synchronous at a single point. Device length is non-critical. Synchronism at the desired point may be obtained by electro-optic or other index control.

DETAILED DESCRIPTION

Figure 1:
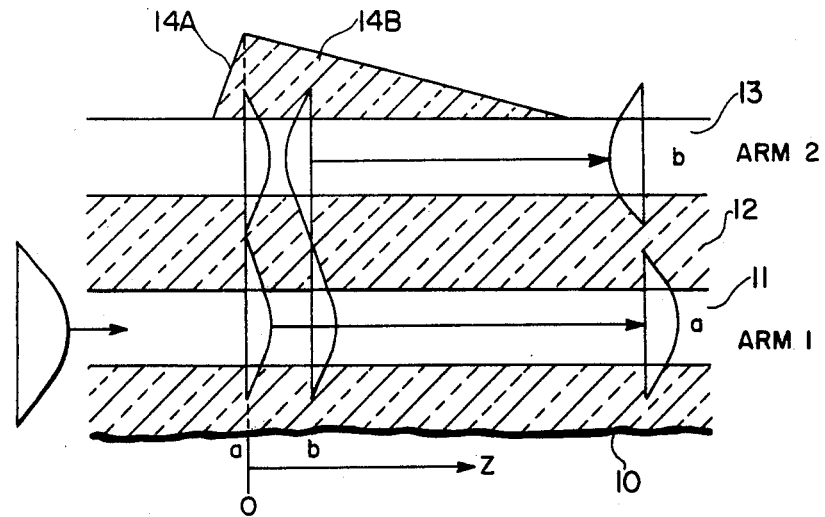
FIG. 1 illustrates a cross-sectional view of an embodiment of the device.

FIG. 1 shows a cross-sectional view of the device. As shown, the device includes a substrate 10 upon which optical waveguide 11 is formed, waveguide 11 being of an optical material having an index of refraction which is greater than that of the substrate. A layer of optical material 12 having a thickness of ½ to 2μm with an index of refraction which is the same as that of substrate 10 overlays optical waveguide 11 and an optical waveguide 13 is formed on the layer 12 of an optical material having a refractive index and thickness which is substantially the same as that of the waveguide 11. A triangular (cross-sectional) overlay 14 is formed over a portion of the waveguide 13. The overlay 14 has the same index of refraction as that of the layer 12 and is of sufficient thickness at its thickest part (at Z = 0) that the fields associated with guided modes in the structure do not extend beyond its upper boundary (1–2μm). From its thickest part at Z = 0, the overlay 14 narrows down to zero thickness with a fast taper 14a as Z becomes more negative and with a slow taper 14b as Z becomes more positive. The physical slopes of these fast and slow tapers are defined qualitatively as follows: The fast taper 14a must be sufficiently steep that nearly complete mode conversion between normal modes of the structure occurs as these normal modes pass under it. The slow taper must be sufficiently shallow that essentially no mode conversion between normal modes of the structure occurs as they pass under it. This latter case is the case of adiabatic propagation. Quantitatively these slopes are defined by:

$$\text{slope of fast taper} \geq 100 \, K/\gamma$$

$$\text{slope of slow taper} \leq K/\gamma \tag{1a}$$

where K is the coupling constant between the guiding layers 11 and 13 and $\gamma$ is the transverse propagation constant in the overlay 14. Typical numbers for the taper slopes are 0.25 and 0.6 × 10$^{-3}$ for the fast and slow tapers respectively. The design of the taper slopes is discussed in detail in "Optical Modal Evolution 3-dB Coupler" by W. K. Burns, et al. in Applied Optics 15, 1053 (1976). A sketch of the overall structure of the coupler device is shown by FIG. 4 in the published article. The relative dimensions and index-of-refraction of the various parts are shown on the sketch.

In operation with input from the negative Z side (FIG. 1). an input mode "a" is injected into arm 1 (layer 11) where it propagates to the beginning of the fast taper. As mode "a" passes through the region of the fast taper, mode conversion occurs and power is transferred from normal mode "a" to normal mode "b". These modes are illustrated in FIG. 1 at or just after the point Z = 0 for clarity of the drawing. At the point Z = 0, the two coupled guides 11 and 13 have the same index and thickness, and are surrounded by cladding material of the same index. If they were well separated, i.e., if layer 12 were very thick they would support identical modes with the same velocity and they are said to be synchronous. Note that this is not the case when the overlay 14 is removed and the coupled guides are said to be non-synchronous. The purpose of the fast taper is to abruptly introduce synchronism and the purpose of the slow taper is to slowly remove it. It is known from the teachings of the Burns, et al., article referred to above that, if Eq. 1a is obeyed and the coupled structure is synchronous at Z = 0, 50% of the input power will transfer from mode "a" to mode "b" by mode conversion caused by the fast taper. Then, at position Z = 0, each normal mode will be excited with ½ the input power and power division between the normal modes will be achieved. Now as these modes propagate through the region of the slow taper 14b, no mode conversion occurs if Eq. 1b is obeyed. The modes evolve adiabatically and without power transfer between them until they attain the shapes shown in FIG. 1 in the non-synchronous region of the device. Mode "a" evolves so that it only exists in arm 1 (11) and mode "b" evolves so that it only exists in arm 2 (13). Power division between layers 11 and 13 is then achieved. The 50–50 power division is determined only by the requirement of synchronism at the point $Z = 0$ and by the conditions of Eq. 1. After synchronism has been removed, the two waveguide arms may be spatially separated to split the power into two different directions.

Figure 2:
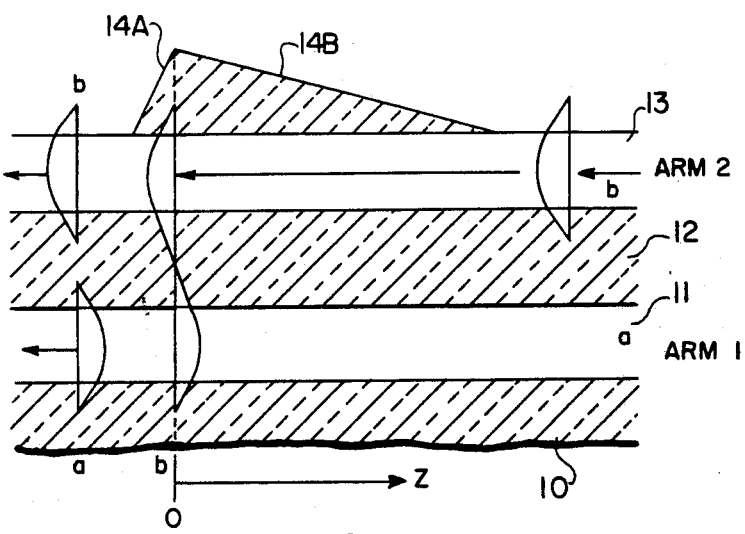
FIG. 2 illustrates operation of the device with incident power from the opposite side.

Operation of the power divider with input power from the opposite side is illustrated in FIG. 2. Input power could be injected into layer 11 or 13 but is shown in layer 13 (mode b) for purposes of illustration. After mode "b" is excited, it travels in the negative Z direction through the region of the slow taper and undergoes adiabatic modal evolution until it attains the shape shown in FIG. 2 at $Z = 0$. It then passes through the region of the fast taper and, as before, 50% of its power is converted to mode "a" shown. 50–50 power division has again been achieved between the modes "a" and "b" which are confined in the non-synchronous region to the layers 11 and 13, respectively. Thus spatial power division is achieved with input from either direction. The conditions for 50–50 power division in this case are the same as those outlined above.

This device is an improvement over power dividers of the mode interference type as described in the Wilson, et al., article referred to above in that here synchronism is only required at a point rather than over a critical coupling length. Also here the overall length of the device is not critical as long as Eq. 1 is obeyed, i.e., as long as the slow taper is sufficiently slow for adiabatic propagation through it.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. An optical waveguide power divider which comprises:
    a substrate formed of optical material;
    a first optical waveguide located on said substrate and formed of an optical material having an index of refraction greater than said substrate;
    a second optical waveguide with thickness and index of refraction substantially equal to those of said first optical waveguide;
    a layer of optical material separating said first optical waveguide from said second optical waveguide with an index of refraction substantially equal to that of said substrate; and,
    an overlay on said second waveguide with an index of refraction substantially equal to said substrate and with a fast taper, sufficiently steep to cause mode conversion, and a slow taper, sufficiently slow to allow adiabatic propagation, both tapers sloping in the direction of the length of said optical waveguides, said tapered overlay being sufficiently thick at its thickest part where said tapers meet to confine below its upper boundary the fields of the modes of said coupled waveguides.

2. An optical waveguide power divider as claimed in claim 1, wherein:
    said first and second waveguides parallel each other.

3. An optical waveguide power divider as claimed in claim 1, wherein:
    the slope of said fast taper $\geq 100 K/\gamma$ and the slope of the slow taper is $\leq K/\gamma$ where
    K is the coupling constant between the guiding layers, and
    $\gamma$ is the transverse propagation constant in the overlay.

* * * * *